UNITED STATES PATENT OFFICE 3,409,581
Patented Nov. 5, 1968

3,409,581
POLYHYDROXYETHER MODIFIED RESOLE PHENOLIC RESINS
Joseph W. Hagan, Jr., Scotch Plains, N.J., assignor to Union Carbide Corporation, a corporation of New York
No Drawing. Filed June 29, 1964, Ser. No. 378,953
11 Claims. (Cl. 260—32.8)

ABSTRACT OF THE DISCLOSURE

The impact resistance, flexibility, and toughness of resole phenolic resins, that is, alkaline catalyzed phenol-aldehyde condensation products, are improved by incorporating therein about 5 to 200 parts by weight of thermoplastic polyhydroxyether per 100 parts by weight of phenolic resin. The thermoplastic polyhydroxyethers are reaction products of substantially equimolar amounts of a polynuclear dihydric phenol and epichlorohydrin said thermoplastic polyhydroxyethers having a degree of polymerization of at least 30.

---

This invention relates to phenolic resins improved in impact resistance, flexibility and toughness. More particularly, the invention relates to phenolic resins wherein greater impact resistance, a higher degree of flexibility and greater toughness are achieved by the presence of a modifier but without significant deleterious effect on desirable phenolic resin properties such as solvent and chemical resistance.

Toughness is effectively measured by impact resistance and flexibility of structures formed from phenolic resins. In this regard tests of coatings are a good index of overall toughness properties. Phenolic resins produce brittle coatings on metal panels which consequently have poor impact values. Since phenolic resin coatings frequently find use in applications where environmental conditions require substantial thickness, brittleness and low impact strength are readily apparent. In fact, in some instances even the dimensional changes caused by normal temperature variations are sufficient to cause severe cracking of a phenolic resin coating system.

Heretofore, it has been attempted to improve the flexibility and impact resistance of phenolic resins by the use of modifiers. Although initial flexibility is improved, such modified phenolic resins deteriorate with aging, become more brittle, and lose flexibility and impact resistance, as they age harden over a period of months. Examples of these modifiers include low molecular weight plasticizers and resins. Because relatively large amounts of such materials are required to cause a perceptible benefit and because these materials are generally quite inferior to phenolic resins in solvent and chemical resistance, the overall performance of the resin suffers although flexibility and impact properties are improved.

It is an object, therefore, of the present invention to provide phenolic resins having improved toughness.

It is another object to provide phenolic material containing systems curable to highly impact resistant, flexible solids.

It is another object to provide such impact resistant and flexible phenolic resins substantially unchanged in solvent and chemical resistance.

It is still another and specific object to provide base layers coated with impact resistant, flexible and tough phenolic resin.

It is a further object to provide methods for improving phenolic resins in impact, flexible and toughness characteristics.

Other objects will be evident from the ensuing description and claims.

It has now been discovered that these and other objects of the present invention are achieved with resole phenolic resins (i.e., alkaline catalyzed phenol-aldehyde condensation products) containing in intimate admixture from about 5 to 200 parts by weight of a thermoplastic polyhydroxyether per 100 parts by weight of phenolic resin, which are curable upon heating to impact resistant, tough phenol-aldehyde condensation resins having excellent solvent resistance. These curable mixtures can be employed in a wide variety of applications including electrical potting and other molding uses, coatings, adhesives, binders for various reinforcements including fiber reinforcement, e.g., metal or glass fibers for fabrication of structures requiring excellent chemical resistance and a higher degree of toughness than unmodified cured phenol-aldehyde condensation resins can provide such as stamping dies and filament wound chemical tanks and tank cars.

The resole phenol-aldehyde condensation products which can be used in this invention are produced by the condensation of phenols and aldehydes under alkaline conditions. A resole produced by the condensation of a phenol with formaldehyde most likely proceeds through an intermediate having the following illustrated type structure:

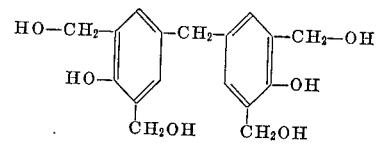

In a typical synthesis, resoles are prepared by heating one mole of phenol with about 1.5 moles of formaldehyde using sodium or barium hydroxide as a catalyst, although any phenolic compound, or a mixture of phenolic compounds having two or three reactive aromatic ring hydrogen positions, can be used with an aldehyde or aldehyde-liberating compound capable of undergoing phenol-aldehyde condensation. Illustrative of phenolic compounds are cresol, xylenol, ethylphenol, butylphenol, isopropyl-methoxyphenol, chlorophenol, recorcinol, hydroquinone, naphthol, 2,2-bis(p-hydroxyphenol)propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin and 1,3,5-trioxane. Ketones such as acetone are also capable of condensing with the phenolic compounds, as are methylene engendering agents such as hexamethylene-tetramine, and are contemplated as useful for preparing the resole resins in this invention.

The condensation of phenolic compound and aldehyde, can of course, be conducted in the presence of other alkaline reagents such as sodium carbonate, sodium acetate, potassium hydroxide, ammonium hydroxide and the like, if desired. When the condensation reaction is completed, if desired, the water and other volatile materials can be removed by distillation, and the catalyst neutralized.

The most suitable resole resins are those which are brought to an advanced state of cure, commonly called the "B" stage, but are still heat-reactive. These resins are insoluble in water, readily soluble in conventional organic solvents such as methyl ethyl ketone, acetone, methanol, ethanol, and the like. Resole resins having a particularly desirable combination of properties are those which have an average molecular weight in the range between about three hundred fifty and six hundred.

The term "thermoplastic polyhydroxyether" herein refers to substantially linear polymers having the general formula:

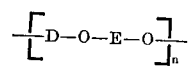

wherein D is the radical residuum of a dihydric phenol, E is an hydroxyl containing radical residuum of an epoxide, and $n$ represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced Viscosity} = \frac{t_s - t_o}{ct_o}$$

wherein $t_o$ is the efflux time of the solvent (tetrahydrofuran), $t_s$ is the efflux time of the poly(hydroxyether) solution, $c$ is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear phenol such as those having the general formula:

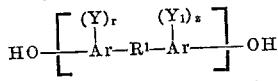

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example

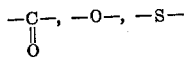

—SO—, —SO$_2$— and —S—S—, and divalent hydrocarbon radicals such as alkylene, alkylidene, cycloaliphatic, e.g., cycloalkylene and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane, 2,4' - dihydroxydiphenylmethane, bis(2-hydroxyphenyl)methane, bis(4 - hydroxyphenyl)methane, bis(4-hydroxy-2,6-dimethyl-3-methoxyphenyl)methane, 1,1-bis(4 - hydroxyphenyl)ethane, 1,2-bis(4-hydroxyphenyl)ethane, 1,1-bis(4-hydroxy-2-chlorophenyl)ethane, 1,1-bis(3 - methyl-4-hydroxyphenyl)ethane, 1,3-bis(3-methyl-4-hydroxyphenyl)propane, 2,2-bis(3-phenyl-4-hydroxyphenyl)propane, 2,2-bis(3-isopropyl-4-hydroxyphenyl)propane, 2,2-bis(2 - isopropyl-4-hydroxyphenyl)phenyl)propane, 2,2-bis(4-hydroxynaphthyl)propane, 2,2-bis(4-hydroxyphenyl)pentane, 3,3 - bis(4 - hydroxyphenyl)pentane, 2,2 - bis(4 - hydroxyphenyl)heptane, bis(4-hydroxyphenyl)phenylmethane, bis(4-hydroxyphenyl)cyclohexylmethane, 1,2-bis(4-hydroxyphenyl-1,2-bis(phenyl)-propane, 2,2-bis(4-hydroxyphenyl)-1-phenyl-propane and the like;

Di(hydroxyphenyl)sulfones such as bis(4 - hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like;

Di(hydroxyphenyl)ethers such as bis(4-hydroxyphenyl)ether, the 4,3'-, 4,2'-, 2,2'-, 2,3'-, dihydroxydiphenyl ethers, 4,4'-dihydroxy-2,6-dimethyldiphenyl ether, bis(4-hydroxy-3-isobutylphenyl)ether, bis(4 - hydroxy - 3 - isopropylphenyl)ether, bis(4-hydroxy-3-chlorophenyl)ether, bis(4-hydroxy - 3 - fluorophenyl)ether, bis(4-hydroxy-3-bromophenyl)ether, bis(4-hydroxynaphthyl)ether, bis(4-hydroxy-3-chloronaphthyl)ether, bis(2-hydroxydiphenyl)ether, 4,4'-dihydroxy-2,6-dimethoxydiphenyl ether, 4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols such as 1,2-bis(p-hydroxyphenyl) - 1 - methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

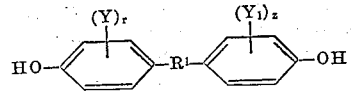

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms, thus,

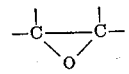

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epichlorohydrins such as epichlorohydrin, epibromohydrin, 1,2-epoxy - 1 - methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate),
bis(3,4-epoxyclcohexyl-methyl)adipate,
bis(3,4-epoxycyclohexylmethyl)phthalate,
6-methyl-3,4-epoxycyclohexylmethyl-6-methyl-3,4-epoxycyclohexane carboxylate,
2-chloro-3,4-epoxycyclohexylmethyl-2-chloro-3,4-epoxycyclohexanecarboxylate,
diglycidyl ether,
bis(2,3-epoxycyclopentyl)ether,
1,5-pentanediol bis(6-methyl-3,4-epoxycyclohexylmethyl) ether,
bis(2,3-epoxy-2-ethylhexyl)adipate,
diglycidyl maleate,
diglycidyl phthalate,
3-oxatetracyclo[4.4.0.1$^{7,10}$.0$^{2,4}$]-undec-8-yl 2,3-epoxypropyl ether,
bis(2,3-epoxycyclopentyl))sulfone,
bis(3,4-epoxyhexoxypropyl)sulfone,
2,2'-sulfonyldiethyl bis(2,3-epoxycyclopentanecarboxylate),
3-oxatetracyclo[4.4.0.1$^{7,10}$.0$^{2,4}$]-undec-8-yl 2,3-epoxybutyrate,
4-pentenal-di-(6-methyl-3,4-epoxycyclohexylmethyl) acetal,
ethylene glycol bis(9,10-epoxystearate),
diglycidyl carbonate,
bis(2,3-epoxybutylphenyl)-2-ethylhexyl phosphate,
diepoxydioxane,
butadiene dioxide, and
2,3-dimethyl butadiene dioxide.

The preferred diepoxides are those wherein each of the oxirane groups is connected to an electron donating substituent which is not immediately connected to the carbon atoms of that oxirane group. Such diepoxides having the grouping

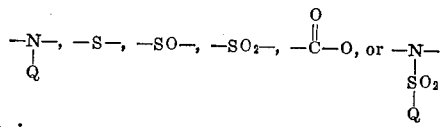

wherein A is an electron donating substituent such as
—O—

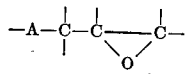

and Q is a saturated hydrocarbon radical such as an alkyl, cycloalkyl, aryl or aralkyl radical.

The composition of the present invention can include the usual additives for thermoplastic or thermosetting resins such as pigments, colorants, opacifiers, lubricants, fillers, extenders and the like without materially affecting the properties of the composition.

These additives can be added to either the phenolic or polyhydroxyether component or to the mixture of the composition components at any time prior to final cure.

The particular mode of incorporation of the thermoplastic polyhydroxyether with the phenolic material is not generally critical for many applications such as molding compositions, where blending, tumbling, stirring, milling and like techniques of intimate mixing can be used. Coatings whether for adhesive or protective and/or decorative purposes can be prepared by dissolving the polyhydroxyether component and the phenolic component in the same or compatible solvents, either before or after mixing the components.

For coating with solutions a wide variety of solvents can be employed. Typical and illustrative solvents are methyl ethyl ketone, tetrahydrofuran, mesityl oxide, dimethyl formamide, methyl Cellosolve acetate (trade name), butyl Carbitol (trade name), butyl Cellosolve (trade name), diethyl Carbitol (trade name), diacetone alcohol, epoxy diglycol, dioxane, dimethyl sulfoxide and 4-methoxy-4-methyl-pentan-2-one and mixtures of the foregoing given in solvent weight ratios, e.g., toluene:butanol 60:40; methyl ethyl ketone:toluene, 1:1; methyl ketone:Cellosolve acetate:toluene 40:40:20 and methyl ethyl ketone:methyl isobutyl ketone:butanol 45:10:45.

The solvent based coatings are generally baked, although room temperature solvent evaporation is sufficient to give an adequate coating. Baking for 15 minutes at 400° F. or 5 minutes at 450° F. is preferred for maximum adhesion. Hot melt coatings can also be employed for applying the coating compositions to various substrates although spraying, dipping or flow coating with solutions of the coating compositions is preferred. Other purposes for which the compositions of this invention can be employed include their use as adhesives and as laminating resins.

The ratio of poly(hydroxyether) to resole phenol-aldehyde condensation product is not narrowly critical so that as little as 5 parts and less of poly(hydroxyether) by weight to 100 parts of resole phenol-aldehyde condensation product enhances flexibility and impact strength. The upper limit is not set by physical limitations since the two components are compatible up to ratios of about 200 parts of polyhydroxyether to 100 parts of resole phenol-aldehyde condensation product but rather by economic considerations since the poly(hydroxyether) is the more costly component. Thus for commercial reasons coating compositions composed of about 5 to 50 parts of poly(hydroxyether) to 100 parts by weight of resole phenol-aldehyde condensation products are preferred.

The following examples illustrate the compositions of the present invention. All parts and percentages are by weight unless otherwise stated.

Example 1

The thermoplastic polyhydroxyether used was prepared by the reaction of equimolar amounts of 2,2-bis(4-hydroxyphenyl)propane and epichlorohydrin together with sodium hydroxide. Equipment used was a vessel provided with an agitator, thermometer, and reflux means. There was placed in the vessel:

| | Parts |
|---|---|
| 2,2-bis(4-hydroxyphenyl)propane | 114.5 |
| Epichlorohydrine (99.1%) pure | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty parts of a 7:3 mixture of toluene:butanol was added to the vessel. Heating of the mixture at 80° C. was continued another two hours. There was added to the vessel an additional 50 parts of the 7:3 toluene:butanol mixture and 4.5 parts of phenol. The contents of the vessel were continued heated at 80° C. (reflux) for 2½ hours. Upon cooling, the reaction mixture was cut with 200 parts of the 7:3 toluene:butanol mixture. One hundred parts of water was added to the vessel and agitated with the contents to dissolve salts present in the reaction mixture. The vessel contents were allowed to settle for ten minutes during which time a lower brine phase formed. The lower phase was separated by decantation. The upper polymer solution containing phase was washed successively with two 160 part portions of water and a mixture of 85% phosphoric acid with 100 parts of water (pH=2) for one hour. The upper polymer solution phase was again separated by decantation and water washed with four successive 200 part portions of water containing 4.5% butanol. The washed polymer was then coagulated in isopropanol, filtered and dried.

A series of cold rolled steel panels were coated with a solution of a composition comprising 90 parts of the phenolic component, a mixed 3:1 phenol:cresol-formaldehyde one-step, heat reactive condensation product, the above thermoplastic polyhydroxy-ether (10 parts) and 150 parts of a 21/40/40 toluene/MEK/Cellosolve acetate solvent system. A compatible mixture resulted. Each panel was dipped in the solution for a period and for a number of times sufficient to get the desired coating thickness and then oven dried at 400° F. for 15 minutes. One set of panels was dried at room temperature to determine blushing characteristics. Final coating thicknesses ranged from 0.5 to 1.0 mil in thinly coated panels. Each panel was tested for coating adhesion by the rapid stripping of conventional cellophane tape from the coated surface in a manner similar to the adhesion test described in the Plastics Engineer's Handbook, p. 639, Reinhold Publishing Co., 1599, N. Y.; for impact resistance by the Gardner Impact Test; for flexibility by a 1/8″ mandrel bend; and for solvent resistance by immersion in toluene. Results are summarized in the table below.

Wood, glass and fabric substrates can similarly be coated.

Example 2

Example 1 was duplicated but using 20 parts of the thermoplastic polyhydroxyether per 80 parts of phenolic composition. Results are summarized in the table below.

Example 3

Example 1 was duplicated but using 30 parts of thermoplastic polyhydroxyether per 70 parts of phenolic composition. Results are summarized in the table below.

Example 4

Example 1 was duplicated but using 40 parts of thermoplastic polyhydroxyether per 60 parts of phenolic composition. Results are summarized in the table below.

Control A

Example 1 was duplicated but omitting the thermoplastic polyhydroxyether to provide a conventional phenolic resin system. Results are summarized in the table below.

Example 5

Example 1 was duplicated but using 50 parts of thermoplastic polyhydroxyether per 95 parts of phenolic resin consisting of a mixed (1:3 by weight) phenol and polyhydric compound and formaldehyde condensation product wherein the polyhydric compound has the formula:

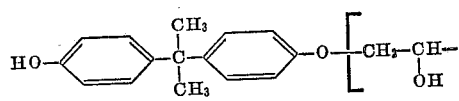

wherein $n$ is 1 or 2.

Results are summarized in the table below.

Example 6

Example 5 was duplicated but using 10 parts of thermoplastic polyhydroxyether per 90 parts of phenolic resin. Results are summarized in the table below.

Example 7

Example 5 was duplicated but using 20 parts of thermoplastic polyhydroxyether per 80 parts of phenolic resin. The results are summarized in the table below.

Control B

Example 5 was duplicated but omitting the thermoplastic polyhydroxyether to provide a conventional phenolic resin system. Results are summarized in the table below.

The compatibility of polyhydroxyether and phenolic resin was determined by casting films of the various resin combinations on a glass plate and curing them for about 15 minutes at 400° F. Completely compatible systems were clear and rated as "CC" while not completely compatible systems were slightly hazy and rated as "C." None of the resin combinations described herein were highly incompatible which would be evinced by phase separations into solids and oils or exudates.

Resistance to toluene was evaluated by visually examining steel specimens coated with the resin combinations after immersion in toluene for varying time intervals. Those coatings showing no softening after immersion in toluene for two weeks were rated "E" for excellent. Coatings which softened after 2 to 3 days immersion in toluene were rated "G" for good. A rating of "P" for poor was reserved for coatings softening in less than 24 hours.

TABLE

| Example | Coating Composition | Coating Thickness (mils) | Dry Film Compatibility | Scotch tape Adhesion to Steel | 1/8 inch Mandrel Flexibility | Gardner Impact (in.-lb.) | Resistance to Toluene |
|---|---|---|---|---|---|---|---|
| Control A | Phenolic,[1] 100 | 0.1-1 | CC | E | Fail | Failed at 10 | E |
| 1 | Phenolic [1]/PHE,[2] 90/10 | 0.5-1 | C | E | Pass | Pass at 40 | E |
| 2 | Phenolic [1]/PHE,[2] 80/20 | 0.5-1 | C | E | do | Pass at 160 | E |
| 3 | Phenolic [1]/PHE,[2] 70/30 | 0.5-1 | C | E | do | do | G |
| 4 | Phenolic [1]/PHE,[2] 60/40 | 0.5-1 | C | E | do | do | E |
| Control B | Phenolic,[3] 100 | 0.5-1 | CC | E | do | Pass at 90 | E |
| 5 | Phenolic [3]/PHE,[2] 95/5 | 0.5-1 | CC | E | do | Pass at 100 | E |
| 6 | Phenolic [3]/PHE,[2] 90/10 | 0.5-1 | CC | E | do | Pass at 130 | E |
| 7 | Phenolic [3]/PHE [2] | 0.5-1 | CC | E | do | Pass at 160 | E |

[1] 1 step, heat reactive 3:1 phenol:cresol-formaldehyde condensation product.
[2] Thermoplastic polyhydroxyether.
[3] 1 step, heat reactive 1:3 phenol:polyhydric compound-formaldehyde condensation product.

Inspection of the table reveals that all systems exhibited (1) excellent adhesion and (2) excellent toluene resistance with the system containing greater proportions of thermoplastic polyhydroxyether (Examples 2 and 3) somewhat better in this regard. In impact resistance, the presence of thermoplastic polyhydroxyether improved all the coatings (Examples 1, 2, 3, 4, 5, 6 and 7). The use of thermoplastic polyhydroxyether provided several fold improvements in impact resistance in most instances.

Similarly, in the flexibility test the 1/8″ mandrel bend, all the coatings were greatly improved.

Remarkably, these improvements were achieved without loss of solvent resistance properties.

Reinforced structures fabricated by coating reinforcement such as glass or metal fiber and then arranging or compacting into a structure are also improved in flexibility. Upon drying the resin system both coats and bonds the fibers together.

What is claimed is:
1. Composition comprising resole phenol-aldehyde con- densation product and per 100 parts thereof from about 5 to 200 parts by weight of a thermoplastic polyhydroxyether reaction product of substantially equimolar amounts of a polynuclear dihydric phenol and epichlorohydrin, said thermoplastic polyhydroxyether having a degree of polymerization of at least 30.

2. Composition claimed in claim 1 containing from about 20 to 50 parts by weight of thermoplastic polyhydroxyether.

3. Composition claimed in claim 1 wherein the degree of polymerization of the thermoplastic polyhydroxyether is at least 80.

4. Composition claimed in claim 1 wherein the polynuclear dihydric phenol is 2,2-bis(4-hydroxyphenyl)propane.

5. Composition claimed in claim 1 dissolved in a ketone solvent.

6. Composition claimed in claim 1 dissolved in methyl ethyl ketone.

7. Composition claimed in claim 1 dissolved in methyl ethyl ketone:toluene(1:1 by weight).

8. Article having an impact-resistant, chemical and solvent-resistant coating comprising a substrate and adhering thereto as a coating, a cured composition of a mixture comprising a resole phenol-aldehyde condensation resin and per 100 parts by weight thereof, from about 5 to 200 parts by weight of a thermoplastic polyhydroxyether reaction product of a polynuclear dihydric phenol and epichlorohydrin, said thermoplastic polyhydroxyether having a degree of polymerization of at least 30.

9. Article claimed in claim 8 wherein the substrate is metal.

10. Article claimed in claim 8 wherein the substrate is wood.

11. Article claimed in claim 8 wherein the substrate is glass.

References Cited

UNITED STATES PATENTS

| | | | |
|---|---|---|---|
| 2,876,208 | 3/1959 | Naps | 117—161 X |
| 2,952,040 | 9/1960 | Phillips | 260—838 X |
| 3,008,848 | 11/1961 | Annonio | 117—161 X |
| 3,177,090 | 4/1965 | Bayes et al. | 117—161 X |
| 3,207,652 | 9/1965 | Shannon | 117—161 X |
| 3,245,925 | 4/1966 | Watson | 117—161 X |
| 3,287,205 | 11/1966 | Bugel | 117—124 X |
| 3,238,087 | 3/1966 | Norwalk et al. | 117—75 X |

WILLIAM D. MARTIN, *Primary Examiner.*

M. R. LUSIGNAN, *Assistant Examiner.*